(12) United States Patent
Drangel et al.

(10) Patent No.: US 8,997,487 B2
(45) Date of Patent: Apr. 7, 2015

(54) TURBOCHARGER

(75) Inventors: Hans H. Drangel, Turin (IT); Lorenzo Magro, Turin (IT); Luca Trabucchi, Grugliasco (IT)

(73) Assignee: GM Global Technology Operations LLC, Detroit, MI (US)

( * ) Notice: Subject to any disclaimer, the term of this patent is extended or adjusted under 35 U.S.C. 154(b) by 54 days.

(21) Appl. No.: 13/596,865

(22) Filed: Aug. 28, 2012

(65) Prior Publication Data

US 2013/0047605 A1    Feb. 28, 2013

(30) Foreign Application Priority Data

Aug. 30, 2011 (GB) .................................. 1114969.7

(51) Int. Cl.
| | |
|---|---|
| *F02B 33/44* | (2006.01) |
| *F02B 39/00* | (2006.01) |
| *F01N 13/18* | (2010.01) |
| *F02B 37/02* | (2006.01) |
| *F02B 67/10* | (2006.01) |
| *F01D 25/12* | (2006.01) |
| *F02C 6/12* | (2006.01) |

(52) U.S. Cl.
CPC .......... *F02B 39/005* (2013.01); *F01N 13/1811* (2013.01); *F01N 13/1816* (2013.01); *F02B 37/02* (2013.01); *F02B 67/10* (2013.01); *Y02T 10/144* (2013.01); *F01D 25/125* (2013.01); *F02C 6/12* (2013.01); *F05D 2260/941* (2013.01); *F05D 2240/50* (2013.01)

(58) Field of Classification Search
CPC . F01M 1/02; F01M 13/1811; F01M 13/1816; F01M 2011/021; F01D 25/16; F02C 6/12; F05D 2240/50; F05D 2260/50; Y02T 10/144

USPC ................ 60/605.3, 280, 321, 322, 323, 324; 417/407; 184/6.11
See application file for complete search history.

(56) References Cited

U.S. PATENT DOCUMENTS

| | | | | |
|---|---|---|---|---|
| 2,775,470 A | * | 12/1956 | Bixler et al. ................... | 277/350 |
| 3,948,052 A | * | 4/1976 | Merkle et al. ................ | 60/605.1 |
| 4,475,341 A | | 10/1984 | Inoue | |

(Continued)

FOREIGN PATENT DOCUMENTS

| | | |
|---|---|---|
| DE | 33 10 494 (A1) | 12/1983 |
| GB | 2 212 858 (A) | 8/1989 |

(Continued)

*Primary Examiner* — Thomas Denion
*Assistant Examiner* — Patrick Maines
(74) *Attorney, Agent, or Firm* — John A. Miller; Miller IP Group, PLC (57) ABSTRACT

A turbocharger for an internal combustion engine, comprising a bearing housing, a rotating shaft coupled to the bearing housing, a compressor wheel mounted at one end of the rotating shaft, a compressor housing accommodating the compressor wheel and provided with an inlet and an outlet for an air stream, a turbine wheel mounted at the opposite end of the rotating shaft, and a turbine housing accommodating the turbine wheel and provided with an inlet and an outlet for an exhaust gas stream, wherein the bearing housing comprises a fastening flange suitable to be fixed to a component of the internal combustion engine, wherein the turbine housing is provided with a connecting pipe for fluidly connecting the turbine housing inlet with an exhaust manifold of the internal combustion engine, and wherein the connecting pipe includes means, for compensating axial thermal deformations thereof.

9 Claims, 5 Drawing Sheets

(56) References Cited

U.S. PATENT DOCUMENTS

| | | | |
|---|---|---|---|
| 4,583,367 A * | 4/1986 | Kapfer et al. | 60/605.3 |
| 4,716,735 A * | 1/1988 | Ruf et al. | 60/605.3 |
| 4,993,227 A * | 2/1991 | Nagura et al. | 60/605.1 |
| 5,275,133 A * | 1/1994 | Sasaki et al. | 123/41.31 |
| 5,392,604 A * | 2/1995 | Nikula et al. | 60/605.3 |
| 5,791,144 A * | 8/1998 | Thompson | 60/599 |
| 2004/0083730 A1 * | 5/2004 | Wizgall et al. | 60/614 |
| 2004/0168441 A1 * | 9/2004 | Dumas et al. | 60/612 |
| 2007/0101713 A1 * | 5/2007 | Battig et al. | 60/598 |
| 2010/0040465 A1 * | 2/2010 | Moran et al. | 415/213.1 |
| 2010/0296920 A1 * | 11/2010 | Koch | 415/180 |

FOREIGN PATENT DOCUMENTS

| | | |
|---|---|---|
| JP | 8-74570 (A) | 3/1996 |
| WO | WO 98/50690 (A1) | 11/1998 |

* cited by examiner

TURBOCHARGER

TECHNICAL FIELD

The present invention relates to a turbocharger for an internal combustion engine, typically for an internal combustion engine of a motor vehicle.

BACKGROUND

An internal combustion engine conventionally comprises an engine block including one or more cylinders, and a cylinder head attached to the cylinder block to close the top of the cylinders. The engine block and the cylinder head are generally formed as aluminum or iron castings. Each of the cylinders accommodates a piston that cooperates with the cylinder head to define a combustion chamber. A fuel and air mixture is disposed in the combustion chamber and ignited, resulting in hot expanding exhaust gasses causing reciprocating movement of the piston. The fuel may be provided through a fuel injector, which injects the fuel directly into the combustion chamber. The pistons are mechanically coupled to a crankshaft, so that the reciprocating movement of the pistons is converted into a rotation of the engine crankshaft.

Each of the cylinders is equipped with at least an intake valve and an exhaust valve, which are actuated by a camshaft rotating in time with the crankshaft. These valves selectively allow the air into the combustion chamber from at least an intake port, and alternately allow the exhaust gases to exit through at least an exhaust port. The intake ports and the exhaust ports are internally defined by the cylinder head.

The air may be distributed to the intake ports through an intake manifold, which is conventionally attached to the cylinder head. The intake manifold is typically formed from aluminum or plastic and includes runner portions in communication with each of the intake ports of the cylinder head. The intake manifold further includes a collector volume, in communication with each of the intake runner portions and with an intake pipe that conveys air from the ambient environment to the collector volume.

The exhaust gases from the combustion chamber may be collected in an exhaust manifold, which is conventionally attached to the cylinder head at the opposite side of the intake manifold. The exhaust manifold is typically formed from stainless steel or cast iron and includes runner portions in communication with each of the exhaust ports of the cylinder head. The exhaust manifold further includes a collector volume, in communication with each of the exhaust runner portions and with an exhaust pipe that conveys the exhaust gases from the collector volume to the ambient environment. One or more aftertreatment devices, typically catalytic aftertreatment devices such as a Diesel Oxidation Catalyst (DOC) and others, are usually located in the exhaust pipe to reduce the pollutant emissions of the internal combustion engine. In order to reduce the footprint of the internal combustion engine, cylinder heads have been recently designed wherein the exhaust manifold, i.e. the exhaust runner portions and the collector volume, is internally defined by the cylinder head itself to form an integral exhaust manifold.

Many internal combustion engines are also equipped with a turbocharger having the function of increasing the pressure of the air entering the engine cylinders, in order to enhance the engine torque. The turbocharger conventionally comprises a bearing housing, which accommodates a rotating shaft, also referred as turbocharger shaft, and the bearings thereof. The bearing housing is generally formed as an aluminum or iron casting. The opposite ends of the turbocharger shaft jut out from the bearing housing. A turbine wheel is fixed to one end of the turbocharger shaft, whereas the opposite end carries a compressor wheel. The turbine wheel and the compressor wheel are respectively accommodated inside a turbine housing and inside a compressor housing, which are fastened at the opposite side of the bearing housing. The turbine housing and the compressor housing are typically formed from stainless steel or cast aluminum. The turbine housing comprises an inlet in communication with the exhaust manifold and an outlet in communication with the exhaust pipe, so that the turbine wheel rotates by receiving the exhaust gases. The compressor housing comprises an inlet in communication with the intake pipe and an outlet in communication with the intake manifold, so that the rotation of the compressor wheel, driven by the turbine wheel via the turbo-charger shaft, increases the pressure of the air in the intake manifold and then in the engine cylinders.

Generally, the entire turbocharger is carried by the turbine housing, whose inlet is defined by a rigid pipe cast in single body with the turbine housing. The free end of this rigid pipe is provided with a fastening flange that is attached directly to the exhaust manifold by means of conventional fastening techniques, such as threaded fasteners. As a matter of fact, the turbine housing is held by the exhaust manifold, whereas the bearing housing is held by the turbine housing itself and the compressor housing is held by the bearing housing. This design implies that the entire turbocharger is fixed to the exhaust manifold in a cantilever fashion, so that it may be subjected to relatively wide oscillations during the operation of the internal combustion engine, which may cause malfunctions and even damages.

In order to solve this drawback, turbochargers have been designed wherein the bearing housing comprises a pedestal having a fastening flange that may be directly fastened to the engine block. Even if this turbochargers are actually carried by the bearing housing, the inlet of their turbine housing is still connected with the exhaust manifold by means of a rigid metallic pipe. Since the exhaust gases exiting the exhaust manifold may be very hot (up to 800° C.), this connection implies that, during the operation of the internal combustion engine, the rigid metal pipe connecting the turbine housing and the exhaust manifold is heated much more than the pedestal connecting the bearing housing and the engine block, thereby causing different thermal deformations which may still be responsible of malfunctions and damages.

In view of the above, it is an object of an embodiment of the invention to provide a turbocharger that can be mounted in a more reliable way, thereby solving or at least positively reducing the above mentioned drawbacks.

Another object is that of meeting this goal with a simple, rational and rather inexpensive solution.

DISCLOSURE

These and/or other objects are attained by the characteristics of the embodiments of the invention as reported in independent claims. The dependent claims recite preferred and/or especially advantageous features of the embodiments of the invention.

More particularly, an embodiment of the invention provides a turbocharger for an internal combustion engine, comprising a bearing housing, a rotating shaft coupled to the bearing housing, a compressor wheel mounted at one end of the rotating shaft, a compressor housing accommodating the compressor wheel and provided with an inlet and an outlet for an air stream, a turbine wheel mounted at the opposite end of the rotating shaft, and a turbine housing accommodating the turbine wheel and provided with an inlet and an outlet for an exhaust gas stream, wherein the bearing housing comprises a fastening flange suitable to be fixed to a component of the internal combustion engine, such as for example an engine block, an exhaust manifold or a cylinder head (especially if the cylinder head has an exhaust manifold integrated therein), wherein the turbine housing is provided with a connecting pipe for fluidly connecting the turbine housing inlet with an exhaust manifold of the internal combustion engine, and wherein the connecting pipe includes means for compensating axial thermal deformations thereof, namely means that allow the connecting pipe to get deformed without generating great axial tensions.

In this way, the connecting pipe of the turbine housing does not interfere with the contemporaneous thermal deformations of the bearing housing, thereby advantageously prevent any malfunction and/or damage of the turbocharger.

According to an aspect of the invention, the connecting pipe may be made from a metallic material, including stainless steel, aluminum, and cast iron.

This aspect of the invention has the advantage of improving the resistance of the connecting pipe to the high temperature (up to 800° C.) of the exhaust gases.

According to an aspect of the invention, the compensating means may comprise a corrugated sheet metal tubular portion of the connecting pipe.

Thanks to this corrugated shape, the thermal deformations of the connecting pipe result in bellows-like axial expansions or contractions of the corrugated sheet metal tubular portion, which do not generate great axial tensions. As a consequence, even if the connecting pipe is heated by the exhaust gasses more than the bearing housing, the difference between the thermal deformations of these two components are advantageously compensated by the corrugated sheet metal portion, thereby preventing malfunctions and damages.

According to an alternative aspect of the invention, the compensating means may comprise at least two separated tubular portions of the metal connecting pipe that are axially inserted into each other.

Thanks to this aspect of the invention, the thermal deformations of the connecting pipe result in mutual axial movement of the two tubular portions thereof, which do not generate axial tensions. As a consequence, even if the connecting pipe is heated by the exhaust gasses more than the bearing housing, the difference between the thermal deformations of these two components are advantageously compensated by the tubular portions, thereby preventing malfunctions and damages.

In this case, at least a sealing ring may be coaxially interposed between the two separated tubular portions of the connecting pipe, in order to advantageously prevent any leakage of exhaust gas therefrom. According to an aspect of the invention, the connecting pipe comprises a fastening flange suitable to be fixed to an exhaust manifold housing. The exhaust manifold housing may be a conventional casting that is attached to the cylinder head, but it may also be a cylinder head that internally defines an integrated exhaust manifold as mentioned above.

This aspect of the invention has the advantage of improving the fluid connection between the turbine housing inlet and the exhaust manifold.

According to another aspect of the invention, the fastening flange of the connecting pipe may be separated from the fastening flange of the bearing housing. i.e. the two fastening flanges may be realized as two separated bodies.

This aspect of the invention has the advantage of simplifying the assembly of the turbocharger and, in particular, the mounting of the turbine housing.

According to an alternative aspect of the invention, the fastening flange of the connecting pipe may be realized in single body with the fastening flange of the bearing housing.

This alternative aspect of the invention has the advantage of simplifying the mounting of the whole turbocharger to the internal combustion engine.

Another aspect of the invention provides that the bearing housing internally defines at least an inlet pipe, which opens onto the bearing housing fastening flange for receiving a fluid, for example a lubricating oil for the turbocharger shaft bearings, from a corresponding pipe internally defined by the internal combustion engine component to which the bearing housing fastening flange is fixed.

It is known that a turbocharger generally requires a lubricating oil supply to lubricate the bearings associated with the turbocharger. The lubricating oil is conventionally supplied by means of external pipes, which fluidly connect the internal volume of the bearing housing with a lubricating circuit internally defined by the engine block and the cylinder head. The last mentioned aspect of the invention has therefore the advantage of integrating this connecting pipes in the bearing housing, thereby simplifying the installation of the turbocharger, reducing the amount of space globally required by this installation, and also preventing most of the problems that are associated with the conventional external lubricant pipes, such as for example leaking problem of the connections thereof.

According to another aspect of the invention, the bearing housing may further internally define another inlet pipe, which opens onto the bearing housing fastening flange for receiving another fluid, for example a coolant, from a corresponding pipe internally defined by the internal combustion engine component to which the bearing housing fastening flange is fixed.

It is known that some turbochargers, especially larger turbochargers and those installed in heavy duty engines, may require to be cooled down with the aid of a coolant circulation. This coolant circulation is conventionally achieved by providing the bearing housing with an internal cooling circuit, which is fluidly connected with the cooling circuit of the internal combustion engine by means of external pipes.

The last mentioned aspect of the invention has therefore the advantage of integrating also this additional connecting pipes in the bearing housing, thereby further simplifying the installation of the turbocharger, further reducing the amount of space globally required by this installation, and also preventing most of the problems that are associated with the conventional external coolant pipes, such as for example the leaking problem of the connections thereof.

In this context, it is clear that the lubricating oil and/or coolant, which are supplied into the bearing housing according to the preceding aspects of the invention, should also be drained therefrom and returned into the engine lubricating circuit and the engine coolant circuit respectively.

For this reason, an aspect of the invention provides that each of the above mentioned inlet pipe(s) is in fluid communication with a corresponding outlet pipe, which is internally defined in the bearing housing.

In order to simplifying the design of the bearing housing, each outlet pipe(s) may open onto a surface of the bearing housing located away from the fastening flange thereof. In this case, each outlet pipe will be fluidly connected with the respective engine fluid circuit by means of an external pipe.

Alternatively, each outlet pipe(s) may open onto the bearing housing fastening flange for directly draining the respective fluid into a corresponding pipe which is internally defined by the internal combustion engine component to which the bearing housing fastening flange is fixed.

This alternative aspect of the invention has the advantage of a more complete integration of the fluid system or systems, i.e. the turbocharger's lubricating and/or cooling system, in the bearing housing, thereby further improving the benefits mentioned above.

Another embodiment of the present invention provides an internal combustion engine system comprising a combustion engine equipped with an exhaust manifold and with the turbocharger disclosed above.

The exhaust manifold may be internally defined by a cylinder head of the internal combustion engine, and the fastening flange of the turbocharger bearing housing may be directly fixed to the cylinder head.

A benefit of attaching the bearing housing to the cylinder head is that of reducing the overall dimensions of the internal combustion engine system.

Another benefit of attaching the bearing housing to the cylinder head is that, being the cylinder head cooled by the engine cooling circuit, it enables heat transfer from the bearing housing direct to the engine cooling circuit, even if no dedicated coolant channels or pipes are provided in the bearing housing.

Still another embodiment of the invention provides an internal combustion engine system comprising an internal combustion engine equipped with:
a cylinder head defining a plurality of exhaust ports and an exhaust outlet; an exhaust manifold internally defined by the cylinder head; wherein the exhaust manifold includes a collector volume in communication with the exhaust ports, through a plurality of exhaust runners, and with the exhaust outlet; and with
the turbocharger disclosed above, wherein the fastening flange of the turbocharger bearing housing is fixed to the cylinder head, and the connecting pipe of the turbine housing is in fluid communication with the exhaust outlet.

This embodiment of the invention has the same advantage mentioned above, in particular those of reducing the overall dimensions of the internal combustion engine system and of enabling heat transfer from the bearing housing direct to the engine cooling circuit, even if no dedicated coolant channels or pipes are provided in the bearing housing.

BRIEF DESCRIPTION OF THE DRAWINGS

The present invention will now be described, by way of example, with reference to the accompanying drawings.

DETAILED DESCRIPTION

Figure 1:
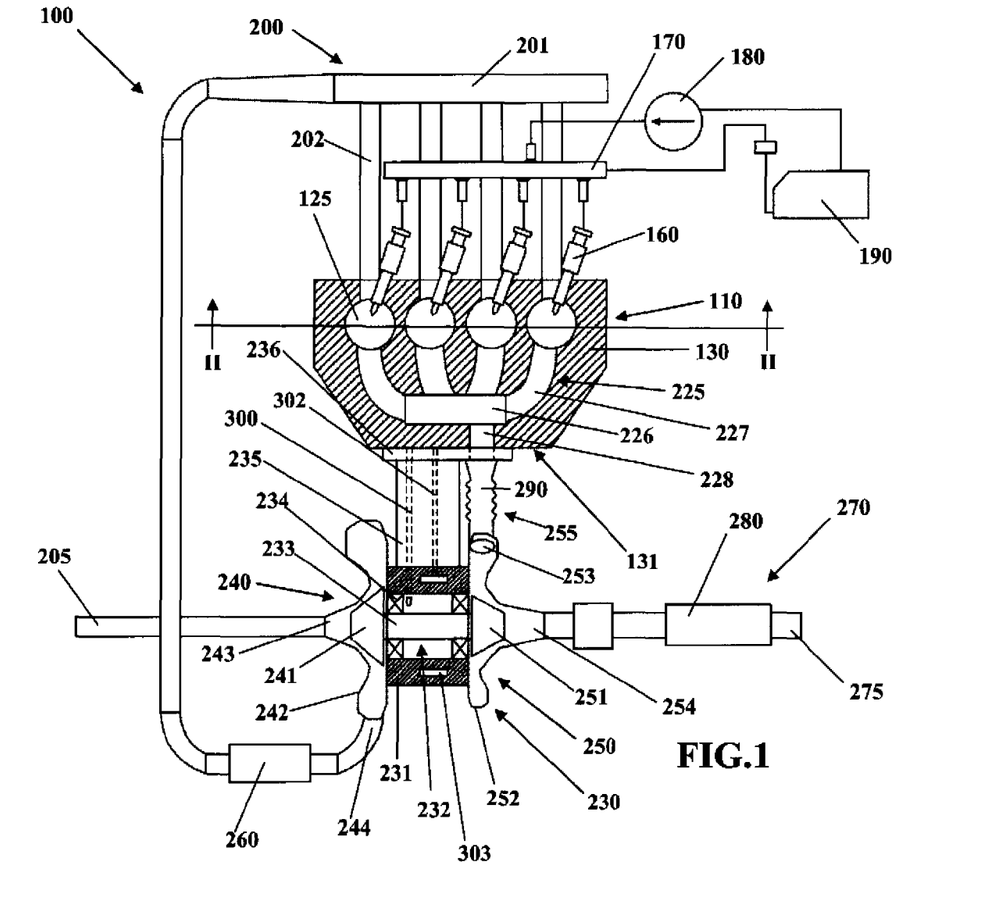
FIG. 1 shows an internal combustion engine system according to an embodiment of the invention.
Figure 2:
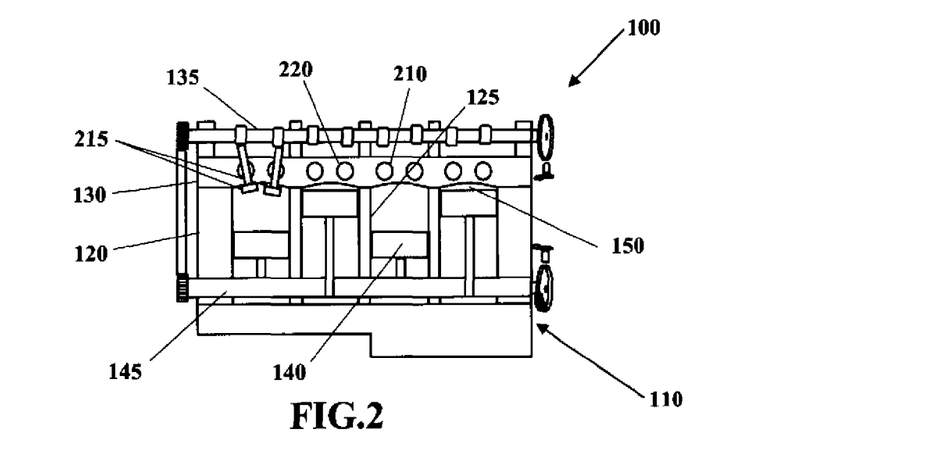
FIG. 2 is the section II-II of the internal combustion engine of FIG. 1.

Some embodiments may include an internal combustion engine system 100, as shown in FIGS. 1 and 2, that includes an internal combustion engine (ICE) 110, in this example a Diesel engine. The ICE 110 comprises an engine block 120 and a cylinder head 130 attached to the top of the engine block 120. The engine block 120 and the cylinder head 130 may be formed as aluminum or iron castings, which are removably mounted to each other using conventional fastening techniques, such as threaded fasteners. The engine block 120 defines at least one cylinder 125 having a piston 140 reciprocally movable therein. The cylinder head 130 closes each of the cylinders 125, thereby cooperating with the relative piston 140 to define a variable volume combustion chamber 150. The cylinder head 130 may also define an upper portion of each cylinder 125. In this example, the engine block 120 and the cylinder head 130 are configured to define an inline four-cylinder ICE 110. However, some embodiments may include an engine block 120 and a cylinder head 130 configured to define a different number of cylinders 125, such as for example 3, 6, 8, 10 or 12. The engine block 120 and the cylinder head 130 may be also configured to define a different engine configuration, such as for example a V-type engine.

A fuel and air mixture (not shown) is disposed in each of the combustion chambers 150 and ignited, resulting in hot expanding exhaust gasses causing reciprocal movement of the pistons 140. The pistons 140 are coupled to a crankshaft 145, so that the reciprocating movement of the pistons 140 is transformed in a rotation of the crankshaft 145. The fuel is provided by one fuel injector 160 per cylinder 125. Each of the fuel injectors 160 is received in a bore internally defined by the cylinder head 130 and it is located within the respective cylinder 125. The fuel is provided at high pressure to the fuel injectors 160 from a fuel rail 170, which is in fluid communication with a high pressure fuel pump 180 that increases the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from at least one intake port 210, and alternately allow exhaust gases to exit the combustion chamber 150 through at least one exhaust port 220. The intake ports 210 and the exhaust ports 220 are internally defined by the cylinder head 130.

The air may be distributed to the intake ports 210 through an intake manifold 200. The intake manifold 200 includes a collector volume 201 and a plurality of runner portions 202, each of which is in fluid communication with the collector volume 201 and with a respective intake port 210 of the cylinder head 130. An air intake pipe 205 may provide air from the ambient environment to the intake manifold 200. The intake manifold 200 may be formed from aluminum or plastic and it may be removably attached to the cylinder head 130 using conventional fastening techniques, such as threaded fasteners.

The exhaust gases exiting the exhaust ports 220 may be collected in an exhaust manifold 225. The exhaust manifold 225 includes a collector volume 226 and a plurality of runner portions 227, each of which is in fluid communication with the collector volume 201 and with a respective exhaust port 220. In this example, the exhaust manifold 225, i.e. the collector volume 226 and the runner portions 227 are internally defined by the cylinder head 130, thereby forming an integral exhaust manifold which advantageously reduces the packaging requirements for the ICE 110. An exhaust outlet 228 is internally defined by the cylinder head 130 and is configured to provide a passage through which the exhaust gases contained within the collector volume 226 may exit the cylinder head 130. More particularly, the exhaust outlet 228 opens onto an substantially flat external surface 131 of the cylinder head 130.

The internal combustion engine system 100 further comprises a turbocharger 230, which schematically comprises a compressor 240 rotationally coupled to a turbocharger assembly 250. Rotation of the compressor 240 increases the pressure and temperature of the air in the intake pipe 205 and manifold 200. An intercooler 260 disposed in the intake pipe 205 may reduce the temperature of the air. The turbocharger assembly 250 rotates by receiving exhaust gases from the exhaust manifold 225.

The exhaust gases exit the turbocharger assembly 250 and are directed into an exhaust system 270. The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters.

Figure 7:
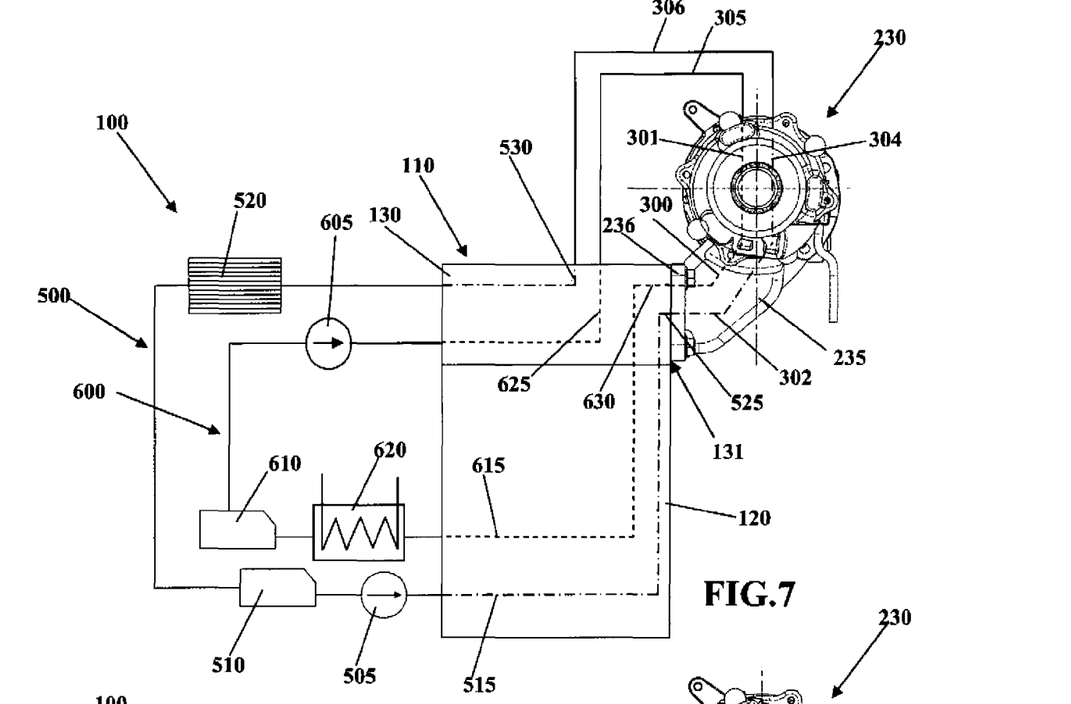
FIG. 7 is a schematic view of the lubricant and coolant connections between the internal combustion engine and the turbocharger of FIG. 3.
Figure 8:
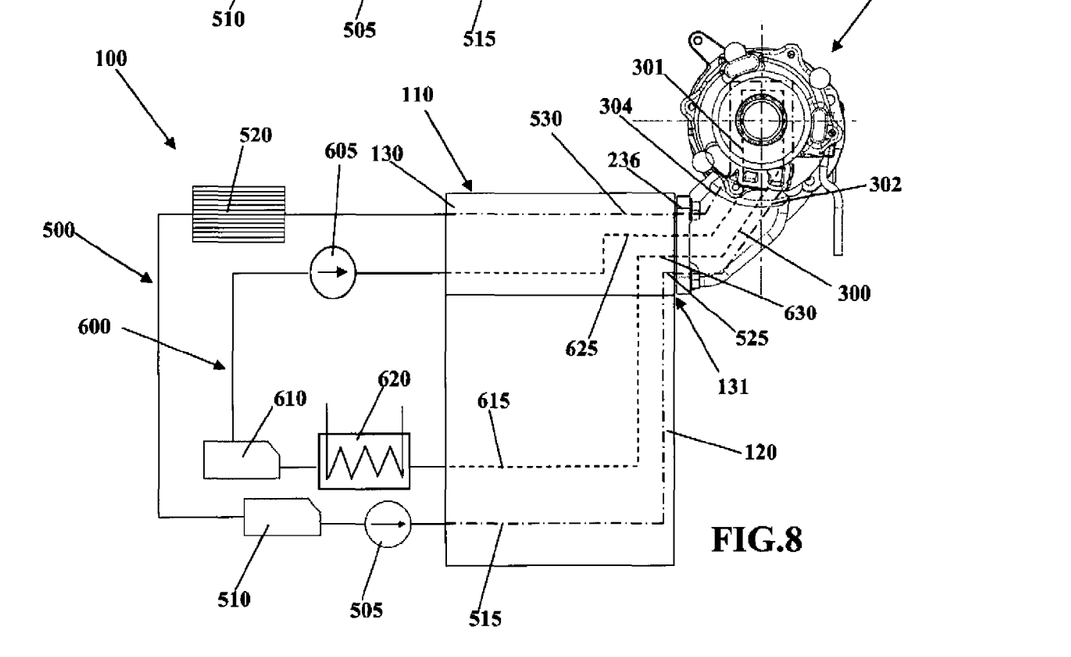
FIG. 8 is a schematic view of the fluid connections of the lubricant and coolant connections between the internal combustion engine and the turbocharger according to an alternative embodiment of the invention.

As shown in FIGS. 7 and 8, the internal combustion engine system 100 may further include an engine cooling circuit 500 for cooling at least the engine block 120 and the cylinder head 130, and an engine lubricating circuit 600 for lubricating the rotating and sliding components of the ICE 110.

The engine cooling circuit 500 schematically comprises a coolant pump 505 that delivers a coolant, typically a mixture of water and anti-freeze, from a coolant tank 510 to a plurality of cooling channels 515 internally defined by the engine block 120 and/or by the cylinder head 130, and a radiator 520 for cooling down the coolant, once it has passed through the cooling channels 515 and before it returns to the coolant tank 510. In the accompanying figures, the cooling channels 515 are simply schematized as a single channel, but those skilled in the art will recognize that the cooling channels 515 are configured to define a much more complicate circuit within the engine block 120 and the cylinder head 130.

The engine lubricating circuit 600 comprises an oil pump 605 that draws lubricating oil from an oil sump 610 and delivers it under pressure through a plurality of lubricating channels 615 internally defined by the engine block 120 and/or by the cylinder head 130, and an oil cooler 620 for cooling down the oil, once it has passed through the lubricating channels 615 and before it returns to the oil sump 610. Also in this case, those skilled in the art will recognize that the lubricating channels 615, simply schematized as a single channel in the accompanying figures, are actually configured to define a much more complicate circuit within the engine block 120 and the cylinder head 130. In particular, the lubricating channels 615 usually include a main oil gallery internally defined by the engine block 120, whence the lubricating oil is directed towards a plurality of exit holes for lubricating many movable components of the ICE 110, before returning in the oil sump 610. These ICE movable components include, but are not limited to, crankshaft bearings (main bearings and big-end bearings), camshaft bearings operating the valves, tappets and the like.

Figure 3:
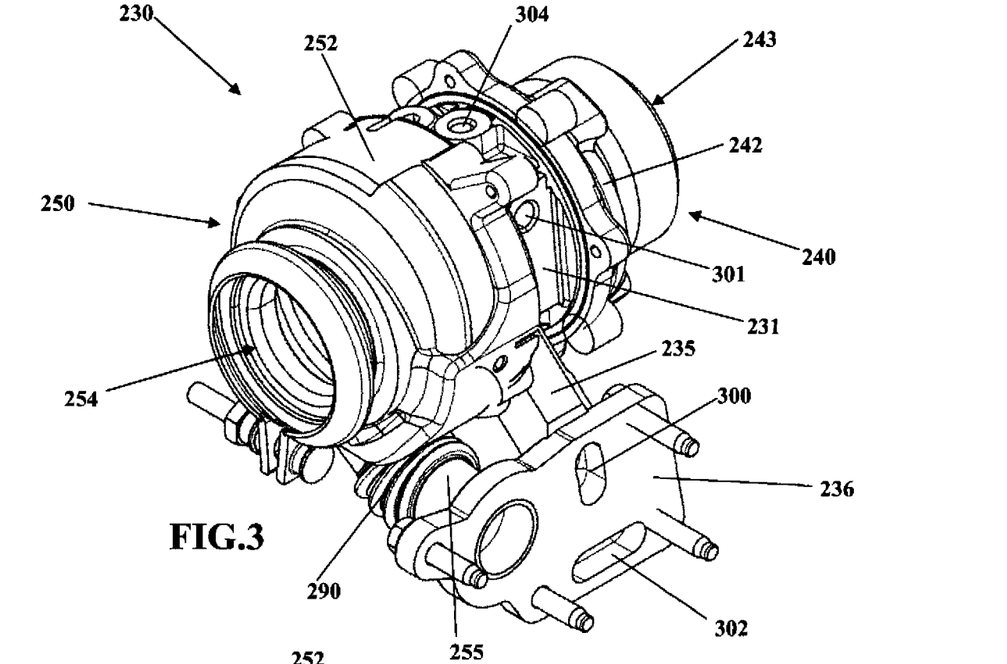
FIG. 3 is a prospective view of a turbocharger according to an embodiment of the invention.

Turning now to the turbocharger 230, this device schematically comprises a bearing housing 231, which may be formed as an aluminum or iron casting. The bearing housing 231 internally defines a substantially cylindrical chamber 232, which coaxially accommodates a rotating shaft 233 and the bearings 234 thereof. Hereafter, the rotating shaft 233 will be simply referred as turbocharger shaft. The opposite ends of the turbocharger shaft 233 jut out from the bearing housing 231. A turbine wheel 251 is fixed to one end of the turbocharger shaft 233, whereas the opposite end carries a compressor wheel 241. The turbine wheel 251 is accommodated within a turbine housing 252, thereby forming the turbocharger assembly 250. The compressor wheel 241 is accommodated within a compressor housing 242, thereby forming the turbocharger compressor 240. The turbine housing 252 and the compressor housing 242 may be formed from stainless steel or cast aluminum and may be fastened at the opposite side of the bearing housing 231 using conventional fastening techniques, such as threaded fasteners. The turbine housing 252 comprises a radial inlet 253 in fluid communication with the exhaust outlet 228 of the exhaust manifold 225, and an axial outlet 254 in fluid communication with the exhaust pipe 275 upstream of the aftertreatment devices 280. The compressor housing 242 comprises an axial inlet 243 in fluid communication with the intake pipe 205 and a radial outlet 244 in fluid communication with the intake manifold 200 upstream of the intercooler 260. In this way, the exhaust gases coming from the ICE 110 expand into the turbine housing 252 and set the turbine wheel 251 in rotation. The rotation of the turbine wheel 251 is transmitted to the compressor wheel 241 by the turbocharger shaft 233. The air coming from the intake pipe 205 is compressed within the compressor housing 242 by the rotation of the compressor wheel 241, and distributed under pressure to the intake manifold 200. In some embodiments the turbine housing 252 may be equipped with a series of vanes (not shown) that directs the exhaust gases from the radial inlet 253 towards the turbine wheel 251. An actuator may be provided for moving these vanes, to form a variable geometry turbine (VGT). In other embodiments, the turbocharger assembly 250 may be of fixed geometry and/or include a waste gate.

The entire turbocharger 230 is carried by the bearing housing 231, which comprises a pedestal portion 235, which extends radially with respect to the internal chamber 232, ending with a substantially flat fastening flange 236. The pedestal portion 235 and the fastening flange 236 are formed in single body with the bearing housing 231. By way of example, the pedestal portion 235, the fastening flange 236 and the bearing housing 231 may be formed in a single aluminum or iron casting. In this example, the fastening flange 236 is directly mounted to the external surface 131 of the cylinder head 130 using conventional fastening techniques, such as threaded fasteners.

Figure 4:
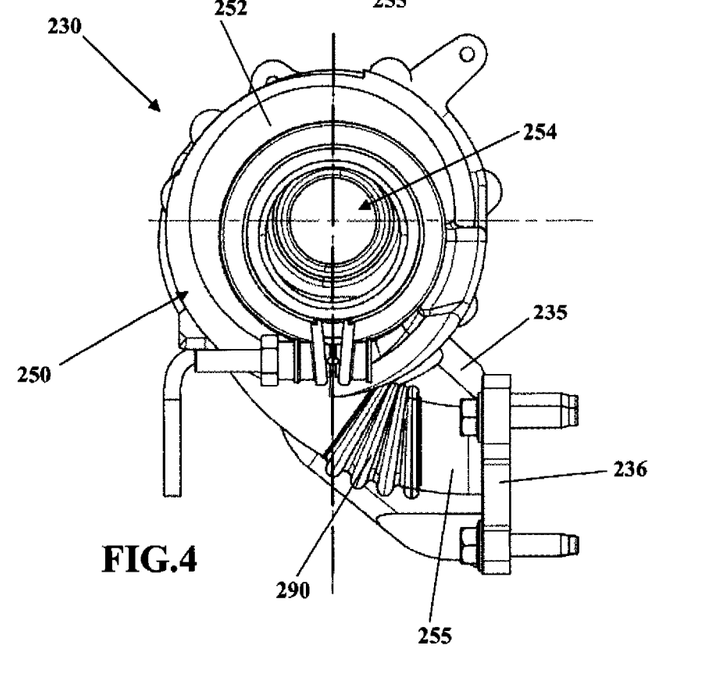
FIG. 4 is a lateral view of the turbocharger of FIG. 3.

The radial inlet 253 of the turbine housing 252 is fluidly connected with the exhaust outlet 228 by means of a connecting pipe 255, typically a sheet metal connecting pipe, which may be formed from stainless steel, aluminum or cast iron. More particularly, an end of the connecting pipe 255 defines a connecting pipe inlet port 255a in communication with the exhaust outlet 228 when the turbocharger 230 is assembled to the ICE 110. The connecting pipe 255 may be realized in single piece with the turbine housing 252 or may be fixed to the latter using conventional fastening techniques. Referring to FIGS. 3 and 4, at least a tubular portion 290 of the connecting pipe 255 is defined by an axial alternation of annular ridges and troughs, which confer to this tubular portion 290 of the connecting pipe 255 a corrugated shape. This corrugated shape implies that any thermal deformation of the connecting pipe 255, caused for example by a variation of the exhaust gas temperature during the ICE operation, results in a bellows-like axial expansion or contraction of the annular ridges and troughs of the corrugated tubular portion 290. This bellows-like expansion or contraction prevents the connecting pipe 255 to transmit great axial tension to the turbine housing 252 that, being carried and tightly kept in position by the bearing housing 231, could be otherwise prone to undue deformations that may cause malfunctions and even damages. Another benefit of the corrugated tubular portion 290 is that of increasing the flexibility of the connecting pipe 255, thereby simplifying the connecting operation of the turbine housing 252 with the exhaust outlet 288 of the exhaust manifold 225.

Figure 9:
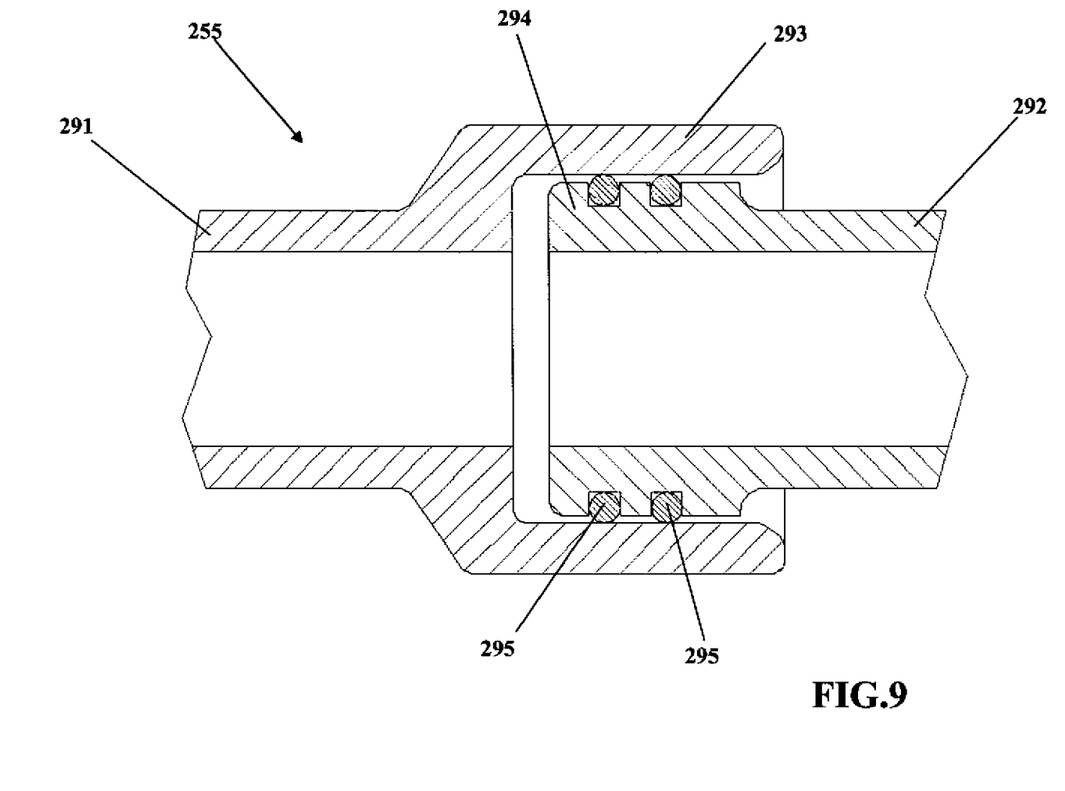
FIG. 9 is a partial view of a connecting pipe belonging to the turbine housing of a turbocharger according to an alternative embodiment of the invention.

According to an alternative embodiment of the invention, shown in FIG. 9, the connecting pipe 255 may be defined by two separated tubular portion 291 and 292. These two tubular portions 291 and 292 are coaxially inserted into each other, coupled in a telescopic fashion. More precisely, a free end 293 of the tubular portion 291 defines a seat that internally receive a free end 294 of the tubular portion 292, so that reciprocal axial movements of the two tubular portions 291 and 292 are allowed. In this way, any temperature variation of the connecting pipe 255, due for example to a variation of the exhaust gas temperature during the ICE operation, results in an axial expansion or contraction of the two tubular portions 291 and 292, which in its turn result a in mutual axial movements of the free ends 293 and 294 thereof, without de-coupling the two tubular portions 291 and 292 nor transmitting axial tensions to the turbine housing 252. In order to prevent leakages of exhaust gas, two sealing rings 295 may be coaxially coupled to the external surface of the free end 294 of the tubular portion 292, arranged to slide in contact with the inner surface of the free end 293 of the other tubular portion 291.

Figure 5:
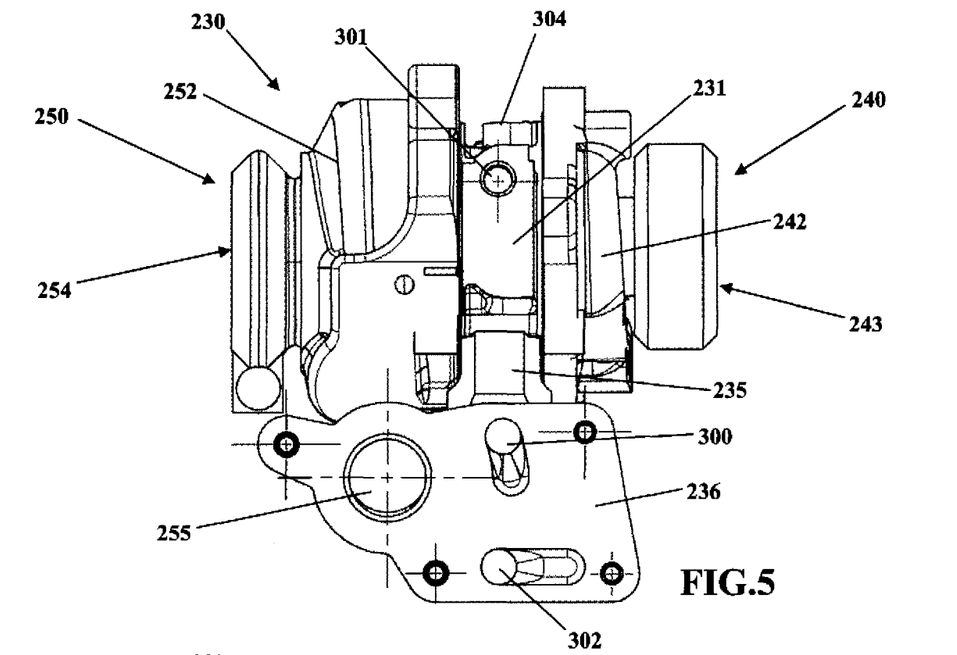
FIG. 5 is a frontal view of turbocharger of FIG. 3.
Figure 6:
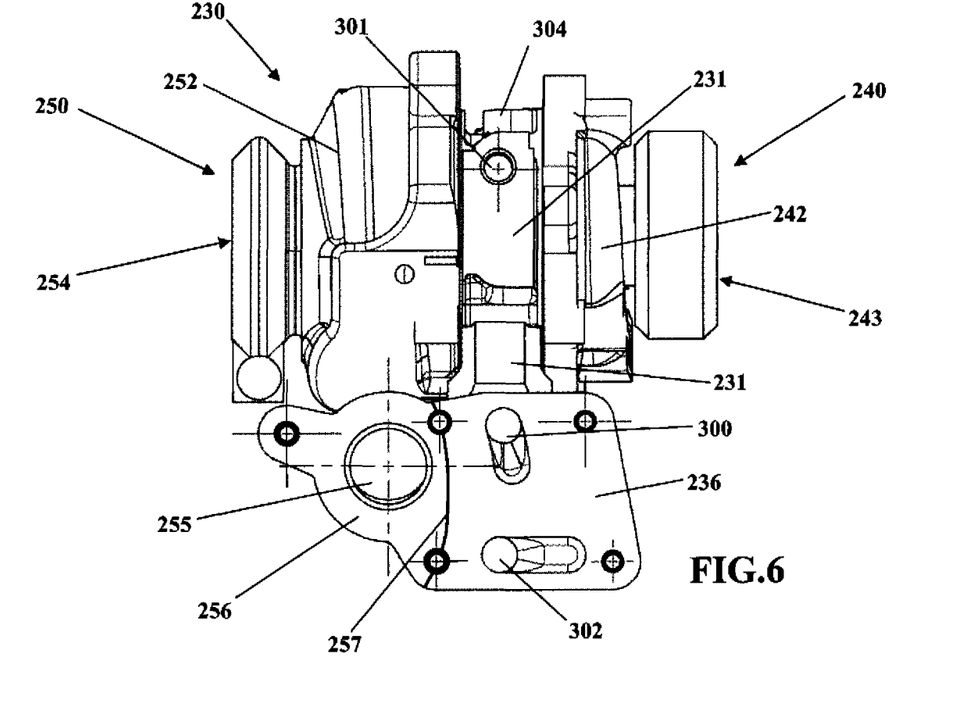
FIG. 6 is the frontal view of a turbocharger according to an alternative embodiment of the invention.

The connecting pipe inlet port 255a may open on a fastening flange, which is fixed at the end of the connecting pipe 255. This fastening flange is fixed to the external surface 131 of the cylinder head 130, so that the connecting pipe inlet port 255a is aligned with the exhaust outlet 288. A gasket may be interposed between the fastening flange and the external surface 131 for sealing the connection. In some embodiments, as shown in FIG. 5, the fastening flange of the connecting pipe 255 may be realized in single body with the fastening flange 236 of the bearing housing. As a matter of fact, the turbocharger 230 comprises a single fastening flange 236, which is provided for fixing the bearing housing 231 to the cylinder head 130 and for connecting the connecting pipe 255 to the exhaust outlet 288. In other embodiments, as shown in FIG. 6, the connecting pipe 255 may be provided with a fastening flange 256 separated from the fastening flange 236 of the bearing housing 231, in order to facilitate the mounting of the turbine housing 252. In this case, the fastening flange 256 may be fixed to the external surface 131, adjacent to the fastening flange 236, using dedicated fastening means, such as for example dedicated threaded fasteners. A thermal insulating body 257 may be interposed between the two fastening flanges 256 and 236.

Referring now to FIG. 3, the turbocharger 230 may comprise a first inlet pipe 300, which opens onto the fastening flange 236 of the bearing housing 231. When the turbocharger 230 is mounted to the cylinder head 130, the first inlet pipe 300 is in fluid communication with a corresponding oil feeding pipe 625 of the engine lubricating circuit 600, which is internally defined by the cylinder head 130 and which is configured to feed the lubricating oil into the first inlet pipe 300. The first inlet pipe 300 is internally defined by, and extends into, the fastening flange 236, the pedestal portion 235 and the bearing housing 231. In particular, the first inlet pipe 300 is configured to convey the lubricating oil into the internal chamber 232 of the bearing housing 231 (as schematically shown in FIG. 1), mainly in order to lubricate the turbocharger shaft bearings 234. The engine lubricating oil exits the internal chamber 232 through a first outlet pipe 301, which is internally defined by the bearing housing 231 and which is in fluid communication with the first inlet pipe 300 via the internal chamber 232. When the turbocharger 230 is mounted to the cylinder head 130, the first outlet pipe 301 is also in fluid communication with a corresponding oil returning pipe 630 of the engine lubricating circuit 600, which is internally defined by the cylinder head 130 and which is configured to receive the lubricating oil from the turbocharger 230.

The turbocharger 230 may also comprise a second inlet pipe 302, which opens onto the fastening flange 236 of the bearing housing 231. When the turbocharger 230 is mounted to the cylinder head 130, the second inlet pipe 302 is in fluid communication with a corresponding coolant feeding pipe 525 of the engine cooling circuit 500, which is internally defined by the cylinder head 130 and which is configured to feed the engine coolant into the second inlet pipe 302. The second inlet pipe 302 is internally defined by, and extends into, the fastening flange 236, the pedestal portion 235 and the bearing housing 231. In particular, the second inlet pipe 302 is configured to convey the engine coolant into an internal cooling circuit 303, for example a system of hollow jackets, which is internally defined by the bearing housing 231, separated from the internal chamber 232 (as schematically shown in FIG. 1). The internal cooling circuit 303 may surround the internal chamber 232 or may be configured in many other alternative ways, provided that the engine coolant in the internal cooling circuit 303 is able to exchange heat with the bearing housing 231, cooling the latter down. The engine coolant exits the internal cooling circuit 303 through a second outlet pipe 304, which is internally defined by the bearing housing 231 and which fluidly communicates with the second inlet pipe 302 via the internal cooling circuit 303. When the turbocharger 230 is mounted to the cylinder head 130, the second outlet pipe 304 is also in fluid communication with a corresponding coolant returning pipe 530 of the engine cooling circuit 500, which is internally defined by the cylinder head 130 and is configured to receive the coolant from the turbocharger 230.

In the examples shown in the figures from 3 to 5, the first outlet pipe 301 and the second outlet pipe 304 opens onto a surface of the bearing housing 231 that is located away from the fastening flange 236 of the bearing housing 231. In this case, the internal combustion engine system 100 may be configured as shown in FIG. 8, wherein both the oil feeding pipe 625 and the coolant feeding pipe 525 open onto the external surface 131 of the cylinder head 130, to match respectively with the first inlet pipe 300 and the second inlet pipe 302, whereas two external draining pipe 305 and 306 are provided for fluidly connecting respectively the first outlet pipe 301 with the oil returning pipe 630 and the second outlet pipe 304 with the coolant returning pipe 530.

According to alternative embodiments, both the first outlet pipe 301 and the second outlet pipe 304 may open onto the fastening flange 236 of the bearing housing 231, as well as the first inlet pipe 300 and the second inlet pipe 302. In this case, the internal combustion engine system 100 may be configured as shown in FIG. 9, wherein the oil feeding pipe 625, the coolant feeding pipe 525, the oil returning pipe 630 and the coolant returning pipe 530, all open onto the external surface 131 of the cylinder head 130, to match respectively with the first inlet pipe 300, the second inlet pipe 302, the first outlet pipe 301 and the second outlet pipe 304.

In each of the above mentioned cases, different gaskets may be interposed between the fastening flange 236 and the external surface 131 of the cylinder head 130 for sealing the coolant and the lubricating oil connections.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

The invention claimed is:

1. An internal combustion engine system comprising an internal combustion engine equipped with an exhaust manifold and with a turbocharger, said turbocharger comprising a bearing housing, a rotating shaft coupled to the bearing housing, a compressor wheel mounted at one end of the rotating shaft, a compressor housing accommodating the compressor wheel and provided with an inlet and an outlet for an air stream, a turbine wheel mounted at the opposite end of the rotating shaft, and a turbine housing accommodating the turbine wheel and provided with an inlet and an outlet for an exhaust gas stream, wherein the bearing housing comprises a fastening flange suitable to be fixed to a component of the internal combustion engine, wherein the turbine housing is provided with a connecting pipe for fluidly connecting the turbine housing inlet with an exhaust manifold of the internal combustion engine, and wherein the connecting pipe includes at least one tubular portion that has an axial alternation of annular ridges and troughs for compensating axial thermal deformations of the connecting pipe and increases the flexibility of the connecting pipe.

2. The internal combustion engine system according to claim 1, wherein the exhaust manifold is internally defined by a cylinder head of the internal combustion engine, and wherein the fastening flange of the turbocharger bearing housing is fixed to the cylinder head.

3. An internal combustion engine system comprising an internal combustion engine equipped with:
   a cylinder head defining a plurality of exhaust ports and an exhaust outlet;
   an exhaust manifold internally defined by the cylinder head; wherein the exhaust manifold includes a collector volume in communication with the exhaust ports, through a plurality of exhaust runners, and with the exhaust outlet; and
   a turbocharger comprising a bearing housing, a rotating shaft coupled to the bearing housing, a compressor wheel mounted at one end of the rotating shaft, a compressor housing accommodating the compressor wheel and provided with an inlet and an outlet for an air stream, a turbine wheel mounted at the opposite end of the rotating shaft, and a turbine housing accommodating the turbine wheel and provided with an inlet and an outlet for an exhaust gas stream, wherein the bearing housing comprises a bearing housing fastening flange suitable to be fixed to a component of the internal combustion engine, wherein the turbine housing is provided with a connecting pipe for fluidly connecting the turbine housing inlet with an exhaust manifold of the internal combustion engine, and wherein the connecting pipe includes at least one tubular portion that has an axial alternation of annular ridges and troughs for compensating axial thermal deformations of the connecting pipe and increasing the flexibility of the connecting pipe, said connecting pipe comprising a fastening flange that is suitable to be fixed to an exhaust manifold housing, wherein the fastening flange of the connecting pipe is separated from the bearing housing fastening flange and is fixed to an external surface that is adjacent to the fastening flange, wherein the bearing housing fastening flange of the turbocharger bearing housing is fixed to the cylinder head, and the connecting pipe of the turbine housing is in fluid communication with the exhaust outlet.

4. The system according to claim 3, wherein the connecting pipe is made from a metallic material, including stainless steel, aluminum, and cast iron.

5. The system according to claim 3, wherein the at least one tubular portion includes a corrugated portion of the connecting pipe.

6. The system according to claim 3, wherein the at least one tubular portion includes two separated tubular portions of the connecting pipe that are axially inserted into each other.

7. The system according to claim 6, wherein a sealing ring is coaxially interposed between the two separated tubular portions of the connecting pipe.

8. The system according to claim 3, wherein the connecting pipe comprises a fastening flange suitable to be fixed to an exhaust manifold housing.

9. The system according to claim 3, further comprising a thermal insulating body that is interposed between the fastening flange and the bearing housing fastening flange.

* * * * *